United States Patent [19]

Shimada et al.

[11] 4,022,738

[45] May 10, 1977

[54] DEVELOPING POWDER

[75] Inventors: Masato Shimada, Tokyo; Katsuomi Kobayashi, Yokohama, both of Japan

[73] Assignee: Ricoh Co., Ltd., Tokyo, Japan

[22] Filed: Nov. 28, 1975

[21] Appl. No.: 636,303

[30] Foreign Application Priority Data

Dec. 12, 1974 Japan .......................... 49-142738

[52] U.S. Cl. ........................ 260/28 P; 252/62.1 R; 252/62.1 P

[51] Int. Cl.[2] ........................................ C08L 91/00

[58] Field of Search ................. 252/62.1 P, 62.1 R; 96/1 SD; 260/28, 848

[56] References Cited

UNITED STATES PATENTS

| | | | |
|---|---|---|---|
| 3,239,465 | 3/1966 | Rheinfrank | 252/62.1 P |
| 3,373,127 | 3/1968 | Bean et al. | 260/28 |
| 3,377,286 | 4/1968 | Stricklin | 252/62.1 P |
| 3,591,503 | 7/1971 | Hagenbach et al. | 252/62.1 P |
| 3,775,326 | 11/1973 | Westdale | 252/62.1 P |
| 3,873,325 | 3/1975 | Westdale | 252/62.1 X |
| 3,925,219 | 12/1975 | Strong | 252/62.1 P |

*Primary Examiner*—Lewis T. Jacobs

*Attorney, Agent, or Firm*—Woodhams, Blanchard and Flynn

[57] ABSTRACT

Developing powder, called the toner, for use in developing an electrostatic latent image or a magnetic latent image, said developing powder consisting essentially of a mixture of low molecular polyolefins and alkyl-modified phenol resins, the developed image being firmly fixed to an image-forming substrate only by applying pressure to the toner image formed on the substrate.

6 Claims, No Drawings

DEVELOPING POWDER

BACKGROUND OF THE INVENTION

In a dry electrophotographic process, i.e. xerography, the following steps are usually involved:

1. Sensitizing the xerographic plate by a corona discharge.
2. Exposing the plate to form an electrostatic latent image.
3. Developing the latent image with fine particles, i.e. developing powder.
4. Transferring the developed image to another material such as paper, and
5. Fixing the image by fusing.

In a magnetic printing process, the following steps are usually involved:

1. Magnetizing an image formed on a printing master which has been prepared by applying a magnetic ink to paper.
2. Developing the magnetized image with fine particles, i.e. developing powder.
3. Transferring the developed image to another material such as paper, and
4. Fixing the image by fusing.

In the dry electrophotographic process, there are used developing powders comprising a mixture of resins and coloring matters such as dyestuffs or pigments. In the magnetic printing process, there are used developing powders comprising a mixture of resins, coloring matters such as dyestuffs or pigments, and ferromagnetic powders such as magnetic iron oxide.

The resins used in preparing the developing powders as shown above include, for example, acrylic resin, epoxy resin, alkyd resin, and a mixture of polyvinylbutyral and rosin-modified phenol-formaldehyde resin.

In the event the conventional developing powders are used, the developed image can be fixed to an image-forming substrate such as paper by heating or by applying solvent vapor. In these processes, heating rolls or means for generating the solvent vapor are required, respectively.

It is an object of the present invention to provide developing powders which can be fixed to an image-forming substrate such as paper by applying pressure only, without heating or applying solvent vapor.

SUMMARY OF THE INVENTION

The present invention relates to developing powder, called the toner, for use in development of an electrostatic latent image formed on a photoconductive layer or a magnetic latent image formed on a supporting sheet.

Said developing powder can be fixed to the support such as paper by applying a pressure without heating or using vapor or organic solvent.

Said developing powder is characterized in that a mixture of low molecular polyolefins and alkyl-modified phenol resins is the principal constituent thereof.

The low molecular polyolefins include polyethylene and polypropylene having a molecular weight (m.w.) of lower than 10,000, preferably 1,000 to 5,000.

The alkyl-modified phenol resins include polycondensation product of alkyl-substituted phenol and formaldehyde. Said alkyl group may be those having $C_4$ to $C_{17}$, and the alkyl-modified phenol resins may preferably be those having a molecular weight of 500 to 1,000. To the polycondensation products as obtained above may be added polycondensation products of phenol or aryl-substituted phenol and formaldehyde.

The developing powder of the present invention consists essentially of a mixture of low molecular polyolefins of 5 to 95 parts by weight and alkyl-modified phenol resins of 95 to 5 parts by weight. To this mixture may be added other synthetic resins and coloring matters (pigments or dyestuffs) as shown below.

The synthetic resins include acrylic resin, rosin-modified phenol resin, epoxy resin, alkyd resin, phenol resin, maleic acid resin, petroleum resin, polyvinyl chloride, polyvinyl acetate, polyurethane, polystyrene and polyvinylnaphthalene.

The coloring matters include pigments, for example, carbon blacks such as acetylene black, lamp black and channel black, and dyestuffs such as Aniline Black, Victoria Blue, Fanal Blue, and Nigrosine.

For the purpose of using the developing powder for development of the magnetic latent image, ferromagnetic powders such as magnetic iron oxide, iron powder or ferrite powder may be mixed to the developing powder.

The developing powder of the present invention may be prepared by kneading a mixture of low molecular polyolefin, alkyl-modified phenol resin, other synthetic resin and coloring matter by means of a kneading machine such as roller mill at a temperature of 120° to 150° C and then pulverizing the cooled mixture and passing through a screen to obtain the powder having particle size of 5$\mu$ to 20$\mu$.

The developing powder thus obtained may be used in a powder form as it is or in a powder form of a mixture with carrier particles such as glass particle or iron particle. The developing powder can be charged positively or negatively by mixing with the carrier particles.

The developing powder can be attracted to the electrostatic latent image formed on a xerographic plate, for example, by cascade method or magnetic brush method to develop the latent image, and the attracted powder, i.e. the developed image, is transferred to another material such as paper. The toner image, i.e. the transferred powder, can be fixed firmly to the paper by applying a pressure, for example, by passing it through pressure rollers at room temperature.

The developing powder of the present invention may be used as a developer for developments of an electrostatic latent image in a xerographic process, an electrostatic latent image formed on zinc oxide-resin coatings, a magnetic latent image in a magnetic printing process and a latent image in an electrostatographic printing process.

In order to fix the developing powder to an image-forming substrate such as paper, a pressure of 200 to 500 kg/cm$^2$ is required.

Low molecular polyethylene and polypropylene are sold by Sanyo Kasei K.K. under the trademark of Sanwax 165P (molecular weight about 5,000) and Biscol 550P, 660P, (molecular weight about 5,000), respectively.

Alkyl-modified phenol resins are sold by Gun-ei Kagaku K.K. under the trademark of PP-5121 and by Hitachi Kasei K.K. under the trademark of Hitanol 1501 and Hitanol 550.

DESCRIPTION OF THE PREFERRED EMBODIMENTS

The following example are given by way of illustration only:

EXAMPLE 1

| | Parts by weight |
|---|---|
| Low molecular polyethylene (m.w. about 5,000) (Sanwax 165P) | 30 |
| Alkyl-modified phenol resin (PP-5121) | 30 |
| Polystyrene (m.w. about 3,000) | 40 |
| Carbon black | 20 |

The ingredients as listed above were kneaded with roller mill at a temperature of 140° C. After having been cooled, the kneaded mass was pulverized. The powder thus obtained was passed through a screen to obtain the developing powder, i.e. the toner, having particle size of about 20μ. A developing agent for use in magnet brush development was prepared by mixing the toner with iron particle having particle size of about 100μ in a weight ratio of 1 to 100. In this developing agent, the toner was negatively charged. An electrostatic latent image formed on the xerographic plate consisting of amorphous selenium was developed with the developing agent obtained above by magnetic brush development. The developed image (toner image) was transferred to paper. The paper having the developed image was passed through rollers which is rotating at peripheral speed of 15 cm/sec and pressure of 300 kg/cm$^2$. In this way, the toner, i.e. developing powder of the present invention, was firmly fixed to the paper to obtain a good copy.

EXAMPLE 2

| | Parts by weight |
|---|---|
| Low molecular polyethylene (m.w. about 5,000) (Sanwax 165P) | 20 |
| Alkyl-modified phenol resin (Hitanol 1501) | 40 |
| Styrene-n-butylmethacrylate copolymer | 40 |
| Carbon black | 10 |

A developing powder, i.e. the toner, having particle size of about 20μ was prepared by kneading the above-listed ingredients in the same manner as that of Example 1. A developing agent for use in cascade development was prepared by mixing the toner with glass particles having particle size of about 500μ in a weight ratio of 1 to 100. In this developing agent, the toner was negatively charged. An electrostatic latent image formed on the xerographic plate was developed with the developing agent obtained above by cascade development. By repeating the same procedure as that of Example 1, the developed image (toner image) was transferred to paper and the toner, i.e. the developing powder of the present invention, was firmly fixed to the paper.

EXAMPLE 3

| | Parts by weight |
|---|---|
| Low molecular polyethylene (m.w. about 5,000) | 30 |
| Alkyl-modified phenol resin (Hitanol 1501) | 10 |
| Petroleum resin | 60 |
| Carbon black | 20 |
| Magnetite ($Fe_3O_4$) | 70 |

A developing powder, i.e. the toner, having particle size of about 20μ was prepared by kneading the above-listed ingredients in the same manner as that of Example 1.

A magnetized image was formed on a printing master which has been prepared by applying a magnetic ink to paper. The magnetized image was developed with the toner prepared above and the developed image (toner image) was transferred to paper by magnetic attraction. The paper having the developed image was passed through rollers in the same manner as that of Example 1. The toner, i.e. the developing powder, was firmly fixed to the paper.

EXAMPLE 4

| | Parts by weight |
|---|---|
| Low molecular polypropylene (m.w. about 5,000) (Biscol 550P) | 50 |
| Alkyl-modified phenol resin (PP-5121) | 30 |
| Polystyrene | 20 |
| Carbon black | 20 |

A developing agent for use in magnet brush development was prepared from the above-listed ingredients in the same manner as that of Example 1. The developing agents thus obtained gave a good copy similar to that of Example 1 by repeating the same procedure as that of Example 1.

We claim:

1. In a flowable, pressure-fixable, dry powder useful as a toner for developing electrostatic latent images or magnetic latent images, said powder consisting essentially of coloring matter selected from the group consisting of pigments and dyestuffs blended with synthetic resin, the improvement which comprises: said synthetic resin consists essentially of a mixture of (A) from 5 to 95 parts by weight of a polyolefin having a molecular weight of from 1000 to 10000 and selected from the group consisting of polyethylene and polypropylene, and (B) from 5 to 95 parts by weight of alkyl ($C_4$ to $C_{17}$)-modified phenol resin.

2. A powder as claimed in claim 1 in which said polyolefin has a molecular weight of from 1000 to 5000.

3. A powder as claimed in claim 1 in which said polyolefin is polyethylene.

4. A powder as claimed in claim 1 in which said polyolefin is polypropylene.

5. A powder as claimed in claim 1 in which said alkyl ($C_4$ to $C_{17}$)-modified phenol resin has a molecular weight of from 500 to 1000.

6. A powder as claimed in claim 5 in which said synthetic resin contains a minor amount of a resin selected from the group consisting of acrylic resin, rosin-modified phenol resin, epoxy resin, alkyl resin, phenol resin, maleic acid resin, petroleum resin, polyvinyl chloride, polyvinyl acetate, polyurethane, polystyrene and polyvinyl naphthalene.

* * * * *